United States Patent
Childers (10) Patent No.: US 7,282,698 B2
(45) Date of Patent: Oct. 16, 2007

(54) SYSTEM AND METHOD FOR MONITORING A WELL

(75) Inventor: Brooks Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/222,357

(22) Filed: Sep. 8, 2005

(65) Prior Publication Data

US 2007/0051882 A1    Mar. 8, 2007

(51) Int. Cl.
*G01J 1/04*    (2006.01)
*G01J 1/42*    (2006.01)
*G01J 5/08*    (2006.01)
*G01B 9/10*    (2006.01)

(52) U.S. Cl. .......................... 250/227.14; 250/227.27; 385/12; 73/152.01

(58) Field of Classification Search ........... 250/227.14, 250/227.18, 227.19, 227.23, 227.27; 356/35.5, 356/73.1, 477; 702/6; 73/152.18, 152.21, 73/152.33; 385/12, 13

See application file for complete search history.

(56) References Cited

U.S. PATENT DOCUMENTS

| | | | |
|---|---|---|---|
| 4,761,073 A | 8/1988 | Meltz et al. | |
| 4,806,012 A | 2/1989 | Meltz et al. | |
| 5,401,956 A | 3/1995 | Dunphy et al. | |
| 5,798,521 A | 8/1998 | Froggatt | |
| 5,880,463 A | 3/1999 | Uchiyama | |
| 5,956,355 A | 9/1999 | Swanson et al. | |
| 6,111,676 A | 8/2000 | Lemus et al. | |

(Continued)

FOREIGN PATENT DOCUMENTS

EP    0277698 A2    8/1988

(Continued)

OTHER PUBLICATIONS

Childers, Brooks A., et al., "Use of 3000 Bragg grating strain sensors distributed on four eight-meter optical fibers during static load tests of a composite structure", *SPIE's 8th International Symposium on Smart Structures and Materials*, Newport Beach, CA, Mar. 4-8, 2001.

(Continued)

*Primary Examiner*—Thanh X. Luu
*Assistant Examiner*—Suezu Ellis
(74) *Attorney, Agent, or Firm*—The H. T. Than Law Group (57) ABSTRACT

An optical fiber extends down hole from an OFDR. A first set of sensors with a centrally-located reference reflector is disposed over a first fiber length, and a second set of sensors with a centrally-located reference reflector is disposed over a second fiber length. The sensors of the first and second sensing lengths are positioned at slightly offset positions from the reference reflectors so as to interleave the reflected signals. Additional sensing lengths may be similarly interleaved. The system is used by sending an optical signal along the optical fiber, detecting a reflected optical signal, separating the optical signal into component signals, and extrapolating a well condition therefrom. Another method includes creating a low frequency signal component in a reflected optical signal by placing at least one sensor beyond a Nyquist sampling distance limit, detecting the low frequency signal component, and extrapolating a well condition therefrom.

22 Claims, 6 Drawing Sheets

U.S. PATENT DOCUMENTS

| | | | |
|---|---|---|---|
| 6,417,507 B1 | 7/2002 | Malvern et al. | |
| 6,480,655 B1 | 11/2002 | Fisk et al. | |
| 6,492,636 B1 | 12/2002 | Chen et al. | |
| 6,545,760 B1 | 4/2003 | Froggatt et al. | |
| 6,566,648 B1 | 5/2003 | Froggatt | |
| 6,606,186 B2 | 8/2003 | Maas | |
| 6,751,556 B2 * | 6/2004 | Schroeder et al. | 702/6 |
| 6,995,352 B2 * | 2/2006 | Hay et al. | 250/227.14 |
| 2003/0142319 A1 * | 7/2003 | Ronnekleiv et al. | 356/477 |
| 2003/0234921 A1 | 12/2003 | Yamate et al. | |
| 2003/0236626 A1 | 12/2003 | Schroeder et al. | |
| 2005/0006090 A1 | 1/2005 | Chemali | |
| 2005/0058457 A1 | 3/2005 | MacDougall | |
| 2005/0219512 A1 * | 10/2005 | Froggatt et al. | 356/73.1 |
| 2007/0012872 A1 * | 1/2007 | Poland et al. | 250/227.14 |

FOREIGN PATENT DOCUMENTS

| | | |
|---|---|---|
| EP | 0 581 871 B1 | 2/1994 |
| EP | 0 692 705 B1 | 1/1996 |
| EP | 1 258 718 A1 | 11/2002 |
| EP | 1 258 719 A1 | 11/2002 |
| EP | 1524509 | 4/2005 |
| WO | WO 03/038385 A1 | 5/2003 |
| WO | WO 2004/001356 A2 | 12/2003 |
| WO | WO 2004/001357 A1 | 12/2003 |

OTHER PUBLICATIONS

Wegmuller, M. et al., "Analysis of the Polarization Evolution in a Ribbon Cable Using High-Resolution Coherent OFDR", *IEEE Photonics Technology Letters*, vol. 13, No. 2 (Feb. 2001) pp. 145-147.

Hui, R., et al., "Low-Coherent WDM Reflectometry for Accurate Fiber Length Monitoring", *IEEE Photonics Technology Letters*, vol. 15, No. 1 (Jan. 2003) pp. 96-98.

Huttner, B., et al., "Optical Frequency Domain Reflectometer for Characterization of Optical Networks and Devices", Comtec, Zietschrift de Informations-und Telekommunkationstechnologie, herausgegeben von SwissCom AG vol. 3-99 (1999) pp. 20-23.

International Search Report and Written Opinion for PCT/US2006/034492, dated Apr. 27, 2007.

* cited by examiner

SYSTEM AND METHOD FOR MONITORING A WELL

BACKGROUND

The invention relates generally to fiber optic sensing technologies. In particular, fiber optic sensors are used to detect conditions within a well.

Available electronic sensors measure a variety of values, such as, pH, color, temperature, or pressure, to name a few. For systems that require a string of electronic sensors over a long distance, e.g., twenty to thirty kilometers or longer, powering the electronic sensors becomes difficult. Conventionally, the powering of electronic sensors requires running electrical wire from a power source to each of the electronic sensors. Powering electronic sensors electrically has been a problem in the petroleum and gas industry. However, electric wires spanning such long distances create too much interference and noise, thereby reducing the accuracy of the electronic sensors.

Optical fibers have become the communication medium of choice for long distance communication due to their excellent light transmission characteristics over long distances and the ability to fabricate such fibers in lengths of many kilometers. Further, the light being transmitted can also power the sensors, thus obviating the need for lengthy electrical wires. This is particularly important in the petroleum and gas industry, where strings of electronic sensors are used in wells to monitor down hole conditions.

As a result, in the petroleum and gas industry, passive fiber optic sensors are used to obtain various down hole measurements, such as pressure or temperature. A string of optical fibers within a fiber optic system is used to communicate information from wells being drilled, as well as from completed wells. For example, a series of weakly reflecting fiber Bragg gratings (FBGs) may be written into a length of optical fiber, such as by photoetching. As is known in the art, the distribution of light wavelengths reflected from an FBG is influenced by the temperature and strain state of the device to which the FBG is attached. An optical signal is sent down the fiber, which is reflected back to a receiver and analyzed to characterize the length of optical fiber. Using this information, down hole measurements may be obtained.

Many methods are utilized to characterize these sensor-containing lengths of optical fiber, including but not limited to optical reflectometry in time, coherence, and frequency domains. Due to spatial resolution considerations, optical frequency-domain reflectometry (OFDR), is a technique under investigation for use in oil well applications. OFDR is capable of spatial resolution on the order of 100 microns.

In OFDR, the probe signal is a continuous frequency modulated optical wave, such as from a tunable laser. The probe signal, which is optimally highly coherent, is swept around a central frequency. The probe signal is split and sent down two separate optical paths. The first path is relatively short and terminates in a reference reflector at a known location. The second path is the length of optical fiber containing the sensors. The reference reflector and the sensors in the length of optical fiber reflect optical signals back toward the source of the signal. These optical signals are converted to electrical signals by a photodetector. The signal from the reference reflector travels a shorter path, and a probe signal generated at a particular frequency at a single point in time is detected at different times from the reference reflector and the sensors. As such, at any point in time, the signal at the receiver is a signal from the reference reflector and a signal from the sensors at slightly different frequencies due to the sweeping nature of the tunable laser source. A difference frequency component stemming from the time delay in receiving the signal from the reference reflector and the sensors in the optical fiber can be observed in the detector signal. The frequency of the difference frequency component determines the position of the sensor on the fiber and the amplitude is proportional to the local back scattering coefficient and optical power. Performing a Fourier transform of the detector signal, one can simultaneously observe the back scattered waves from all points along the fiber under test.

The operational properties of an OFDR are governed by the wavenumber spacing, $v$, the wavelength sweep range, $R$, the data acquisition frequency, $f$, and the sensing fiber length, $L_S$. As discussed in greater detail herein, the sensing length $L_S$ is a simple function of $L$, but $L$ also affects $v$, $R$, and $f$. Increasing the sensing length $L_S$ by making $L$ arbitrarily large consequently reduces the wavelength sweep range $R$ and increases the data acquisition frequency $f$ to impractical values. Similarly, the wavelength sweep range $R$ can be restored by increasing $N$, but this increase comes at the expense of the size of the data set required and the amount of time required for FFT computation. Maximizing the sensing length while maintaining speed and efficiency is a difficult challenge in the successful construction of an OFDR. Given these challenges, a typical OFDR system is currently limited to a sensing length of about 100 meters. Therefore, a need exists in the art for efficiently extending the useful sensing lengths for OFDR systems.

SUMMARY OF THE INVENTION

Briefly, in accordance with one embodiment of the present invention, a system for monitoring a well includes an OFDR surface instrumentation unit having an optical fiber extending therefrom. At least one optical sensor is disposed along a length of the optical fiber, and means for increasing a sensing length of the optical fiber are included in the system.

According to another aspect of the present invention, a system for monitoring a well includes an OFDR surface instrumentation unit with an optical fiber extending from the OFDR unit. A first set of sensors is disposed at a first set of locations over a first length of the optical fiber. A second set of sensors is disposed at a second set of locations over a second length of the optical fiber. The second set of locations corresponds to but is slightly offset from the first set of locations. Centrally located between each of the first and second lengths are first and second reference reflectors, respectively.

According to yet another aspect of the present invention, a system for monitoring a well includes an OFDR surface instrumentation unit with an optical fiber extending therefrom. Along the length of the optical fiber, a reference reflector is disposed between a first plurality of sensors disposed at a first set of distances as measured from the reference reflector and a second plurality of sensors disposed at a second set of distances as measured from the reference reflector. The second set of distances is similar to but slightly offset from the first set of distances.

According to yet another aspect of the present invention, a system for monitoring a well includes an OFDR unit having an optical fiber extending therefrom. A reference reflector is disposed along the length of the optical fiber, as are a plurality of sensors. At least one sensor is placed beyond the distance limit imposed by Nyquist sampling.

According to another aspect of the present invention, a method for monitoring a condition within a well includes the steps of (1) transmitting an optical signal down an optical fiber, wherein the optical fiber contains at least two sensing lengths comprising a plurality of sensors with centrally located reference reflectors; (2) detecting an optical signal reflected from the at least two sensing lengths; (3) separating the optical signal into component signals; and (4) extrapolating the condition from the component signals.

According to another aspect of the invention, a method for monitoring a condition within a well includes the steps of (1) sending an optical signal along an optical fiber to a plurality of sensors; (2) creating a low frequency signal component in a reflected optical signal by placing at least one sensor beyond a distance limit imposed by Nyquist sampling; (3) detecting the reflected optical signal; (4) converting the low frequency signal component into usable sensor data; and (5) extrapolating the condition from the usable sensor data.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The operational properties of an OFDR are governed by the wavenumber spacing, $v$, the wavelength sweep range, $R$, the data acquisition frequency, $f$, and the sensing fiber length, $L_S$. Each of these parameters is described by the following equations:

$$v = \frac{1}{2nL} \qquad \text{Eq. 1}$$

where n is the refractive index of the fiber, and L is the length of a reference interferometer;

$$R = \frac{\lambda_O(1-\lambda_O N v)}{(1+\lambda_O N v)} \qquad \text{Eq. 2}$$

where $\lambda_O$ is the initial wavelength of the wavelength sweep, and N is the number of data points acquired during a measurement;

$$f = \frac{N\dot{v}}{R} \qquad \text{Eq. 3}$$

where $\dot{v}$ is the laser wavelength sweep rate; and $$L_S = \frac{L}{4}. \qquad \text{Eq. 4}$$

N can be further described by the following equation:

$$N = 2^p \qquad \text{Eq. 5}$$

where p is a power of two for facilitating the use of fast Fourier transforms in the processing of the signal data.

The sensing length $L_S$ is a simple function of L, but L also effects v, R, and f. Achieving a long sensing length $L_S$ by making L arbitrarily large reduces the wavelength sweep range R and increases the data acquisition frequency f to impractical values. Additionally, the wavelength sweep range R can be restored by increasing N, but this increase also increases the size of the data set required and, therefore, the amount of time required for FFT computation. The data acquisition frequency f can be restored by decreasing $\dot{v}$; however, achieving slow and linear wavelength sweeping is difficult to achieve in practice and currently has a limit of about 4 nm/s. Finding an appropriate balance among these parameters for an application typically results in a relatively low sensing length $L_S$ and a long reference interferometer. For example, if the desired sensing length is 10 km and the wavelength sweep range R is 45 nm, common parameters for a strain application, the other parameters work out to f=190 MHz, N=2147483648, so that the required reference interferometer is 40 km. Given these challenges, a typical OFDR system is limited to about 100 meters of sensing length.

Figure 1:
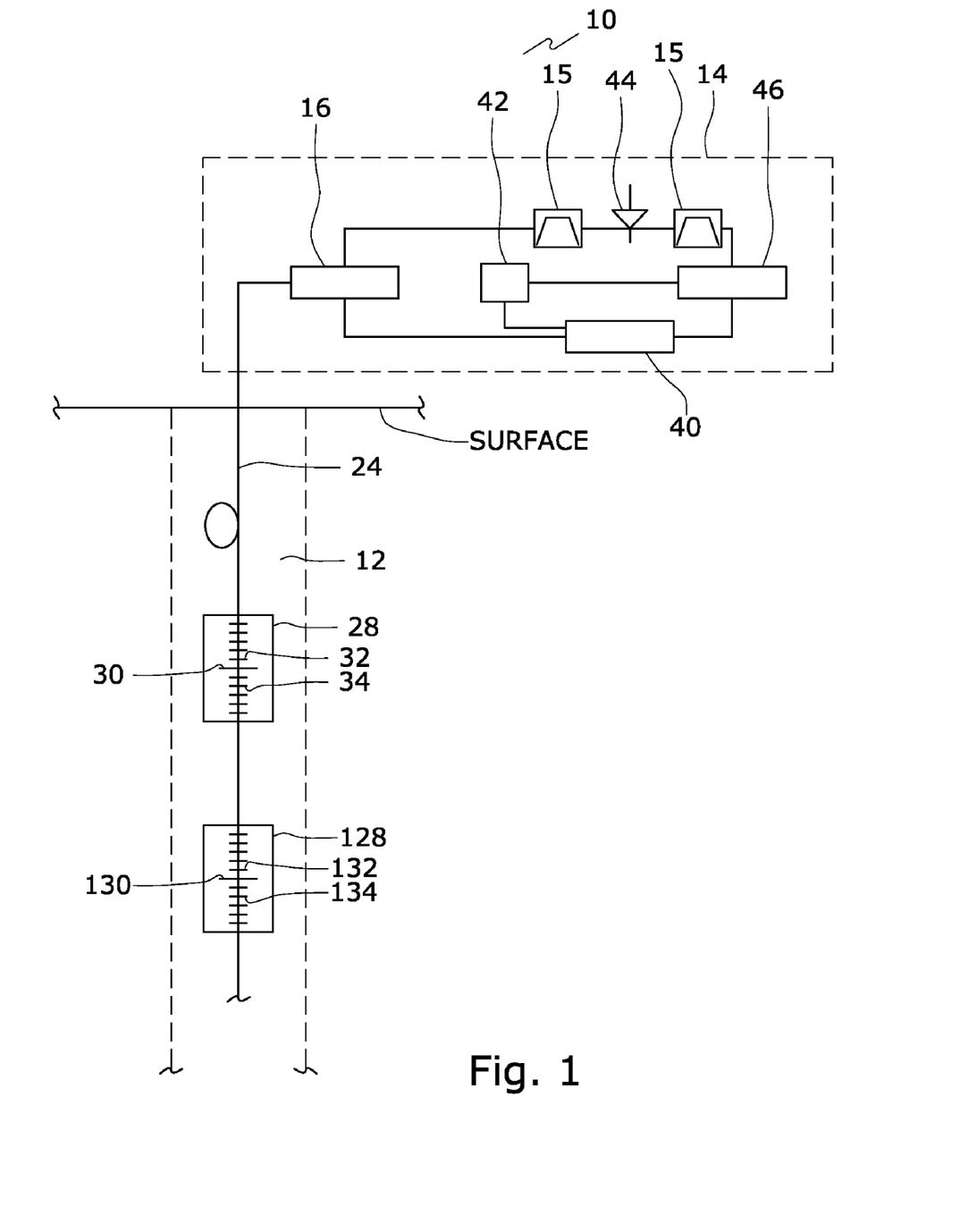
FIG. 1 is a schematic drawing of a sensor system according to the present invention.

As illustrated in the accompanying drawings and discussed in detail below, the present invention is directed to a system 10 for sensing conditions in a well 12 such as an oil or natural gas well. As shown in FIG. 1, generally, system 10 includes an OFDR surface instrumentation unit (SIU) 14 optically connected to a length of fiber 24 that extends into well 12. Fiber 24 is connected to OFDR SIU 14 via a coupler 16.

OFDR SIU 14 includes a tunable laser 40, an internal interferometer 42, a detector 44 and a processing unit 46. Preferably, laser 40 has a tuning range of over 120 nm, although any tuning range may be applied to the present invention. Laser 40 preferably has a coherence length of more than 1 km, although the present invention may be adapted to lasers with shorter coherence lengths. Laser 40 generates coherent light, preferably in the 750-1550 nm range, although other wavelengths of light may also be used.

Interferometer 42 is preferably a length of coiled fiber and a photodetector internally located within SIU 14. Interferometer 42 is used to trigger sampling of the return signals at equal wavenumber intervals. In another embodiment, more than one interferometer 42 is internal to SIU 14. Detector 44 may be any type of photodetector known in the art capable of detecting the light signals in the wavelength range generated by laser 40, such as InGAs, Si, and Ge photodiodes. Optionally, filters 15 may be used in SIU 14 to further enhance the signal to prior to detection.

Fiber 24 is any type of optical fiber capable of transmitting light inside well 12. Fiber 24 has sufficient length to provide information regarding engineering parameters within well 12 to the maximum depth, such as 7,000 to 9,000 meters. Typical engineering parameters include but are not limited to temperature, strain, pressure, position, shape and vibration.

At a first location along the length of fiber 24 is a first sensing length 28. Sensing length 28 includes a reference reflector 30 and pluralities of sensors 32, 34. As discussed above, the operational distance of an OFDR system is practically limited to about 200 meters; specifically, the distance from reference reflector 30 to the farthest sensor in fiber 24 must be less than 200 meters, however, this distance can be measured on both sides of reference reflector 30, so the total sensing length 28 may increased to 400 meters as long as reference reflector 30 is placed in the center of sensing length 28.

Reference reflector 30 is any type of reflector known in the art, preferably a Fresnel reflector. While reference reflector 30 may be chosen to reflect only a limited band of wavelengths, preferably reference reflector 30 is a broadband reflector that is not band limited.

Sensors 32, 34 may be any type of optical sensor known in the art, preferably FBGs. FBGs, particularly weak FBGs, may be written directly onto fiber 24 via, for example, photoetching. Interpretation of Rayleigh scattering may also be used as sensors 32, 34. For example, a reading may be taken of the Rayleigh scattering at various locations along the length of fiber 24, such as at locations of "sensors" 32, 34. This known Rayleigh scattering profile of fiber 24 is then stored in memory in processor 46. First sensor length 28 may include any number of sensors 32, 34 up to the maximum allowable for OFDR sensing, or first sensor length 28 may include only one sensor along its length. The number of sensors is typically limited by the requirement that some light is reflected from all the sensors and sufficient light must be transmitted to the final sensor for reflection back to SIU 14. For example, a minimum of 10% illumination of the last sensor may be required. If all of the sensors reflect at the same wavelength and all of the sensors at 0.0001% reflective, then the maximum number of sensors is 23,000 sensors. The maximum spacing then is simply the desired sensing length divided by 23,000. The minimum spacing is generally the width of a sensor, typically around 5 mm.

Figure 2A:
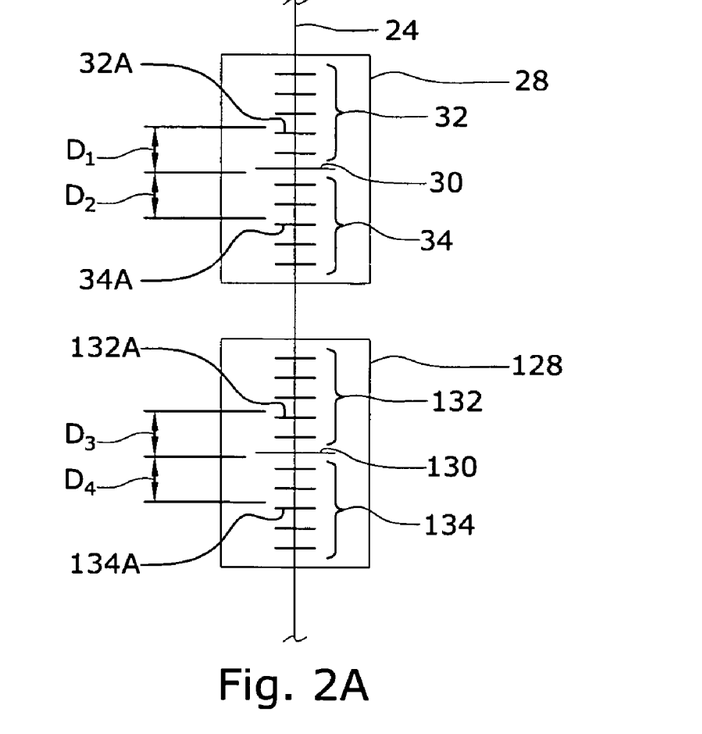
FIG. 2A is a schematic drawing of a first and a second sensing region of FIG. 1.

Using a physical interleaving technique, pluralities of sensors 32, 34 may be placed on both sides of reference reflector 30. As can be seen in FIG. 2A, first plurality of sensors 32 is located before reference reflector 30 and second plurality of sensors 34 is located after reference reflector 30 along the length of fiber 24. In order for the reflected signals not to overlap after FFT, the individual sensors within pluralities of sensors 32, 34 must be placed at slightly offset distances from reference reflector 30. For example, as shown in FIG. 2A, both first plurality of sensors 32 and second plurality of sensors 34 contain five individual sensors placed. For each sensor 32A in first plurality of sensors 32, a corresponding sensor 34A is placed in second plurality of sensors 34. Sensor 32A is located a first distance D1 from reference reflector 30. Sensor 34A is located a second distance D2 from reference reflector 30, where D2 is similar to but either slightly greater or slightly less than distance D1. In general, the offset or difference between D1 and D2 may be as short as the width of a sensor. Offsets can be as long as the desired sensing length. The optimal spacing depends on several factors, including the particular range of temperatures and strains expected to be placed on fiber 24.

Expanding this physical interleaving technique, a second sensing length 128 may be added to fiber 24. Second sensing length 128 is similar in proportion to first sensing length 28, but is disposed further along fiber 24, i.e., second sensing length 128 will sense a deeper location of well 12. Second sensing length 128 includes a reference reflector 130 located in the center of second sensing length 128 and a plurality of sensors 132, 134 on either side of reference reflector 130. Electronic filters are included in SIU 14 to reduce coherent interference of the light signals reflected from the various sensing lengths 28, 128. If the coherence length of the source is limited, interference between the first and second sensing length may be insignificant.

Figure 2B:
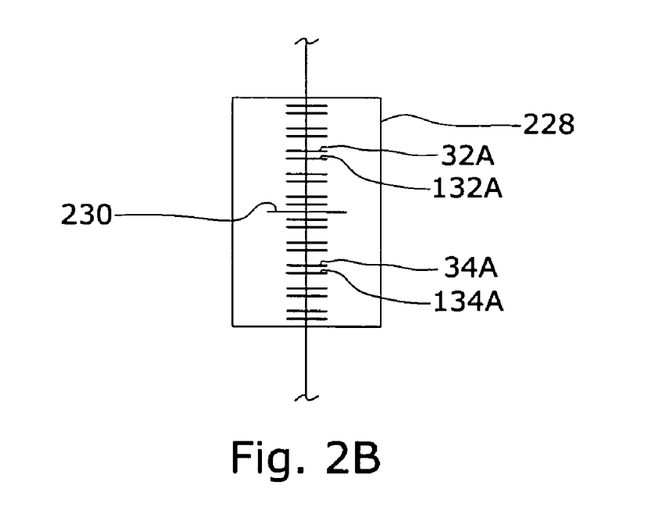
FIG. 2B is a schematic drawing of a virtual sensing region of FIG. 1.
Figure 2C:
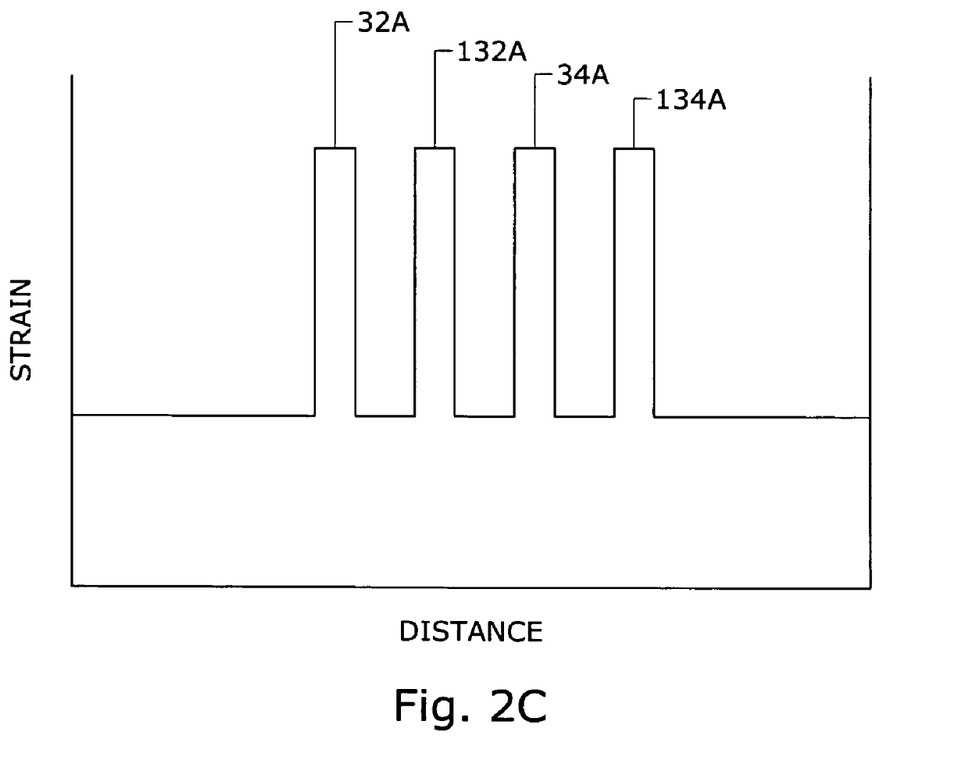
FIG. 2C is shows an idealized return signal from the sensor system of FIG. 1.
Figure 3:
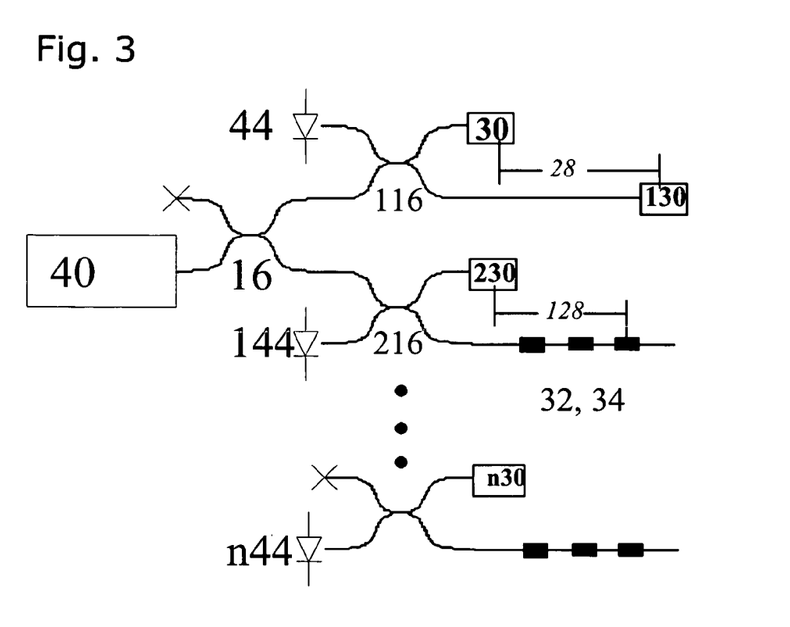
FIG. 3 is a diagram of a sensor system according to the present invention adapted to more than two sensing regions on separate sensing fibers.

As a result, SIU 14 detects a signal as if from a virtual interleaved sensing length 228 as shown in FIG. 2B with a virtual reference reflector 230, where the signals from first sensing length 28 and second sensing length 128 combine. FIG. 2C shows an idealized portion of the signal received from sensors 32A, 34A, 132A, and 134A. Due to the similar but slightly different locations of sensors 32A, 132A, 34A, 134A along fiber 24, the signal from sensors 32A, 34A will not overlap the signals from sensors 132A, 134A. The signals received from first and second sensing lengths 28, 128 will be readily identifiable based upon their unique position. It is believed that no fundamental limit exists for the number of sensing lengths that may be interleaved in this manner. However, for the purposes of practicality and for monitoring conditions in a well, it is believed that up to five sensing lengths may be physically interleaved to create a maximized virtual interleaved sensing length 228. As shown in FIG. 3, the physical interleaving technique of the present invention may be extended to n sensing lengths on separate fibers. For example, couplers 116 and 216 are shown connecting to optical fibers featuring sensing lengths 28 and 128, respectively, as well as to detectors 44 and 144. This extension results in extending the overall sensing length for system 10 to 2 km (400-meter sensing lengths*5 interleaved sections). This is not, however, a fundamental limit and increases in data acquisition frequency, available memory, and reference interferometer length make sensing over 10 km possible without wavelength division multiplexing.

After the maximum number of sensors have been placed using the physical interleaving technique described above, the length of fiber 24 for use in sensing system 10 may be further extended using wavelength division multiplexing (WDM) principles. An FBG responding to the maximum combination of temperature and strain will shift approximately 10 nm. Laser 40 may be tuned over a range that is greater than 10 nm, preferably 120 nm. For a tunable range of 120 nm, 12 wavelength divisions are available. In other words, as laser 40 cycles through its tunable range, each set of physically interleaved sensing lengths 228 may be designed to respond only to a wavelength that is 10 nm different from the next set of physically interleaved sensing lengths 228. For example, given a 400 meter sensing length, a virtual interleaved sensing length 228 maximized to include five actual sensing lengths, and 12 wavelength divisions, a total sensing length of 24 km (400 meters*5 interleaved sensing lengths*12 wavelength intervals) may be achieved. This is not a fundamental limit and increases in data acquisition frequency, available memory, and reference interferometer length make sensing over 100 km possible Additional length can also be obtained by using an aliasing technique. If sensors 32, 34, 132, 134 are narrowband FBGs, they may be placed outside of the Nyquist sampling distance. This results in a low frequency signal component that, when sampling data, is typically regarded as undesirable noise. However, if intentionally placed, the low frequency signal component instead allows the signal from sensors 32, 34, 132, 134 placed "too far" away from the sampler to alias back into the passband. SIU 14 may then extrapolate the desired information from the low frequency component.

In operation, laser 40 emits a light signal that is sent down fiber 24 and reflected back to detector 44. The trigger interferometer provides a clocking signal from which the sampling of the data is triggered at equal steps in optical frequency. Due to the plurality of reflectors in fiber 24, an interference pattern is created in the reflection as received on detector 44. Processing unit 46 can calculate the interferometer optical path length difference between any given sensor and the related reference reflector is given by $$2nL \quad \text{(Eq. 6)}$$

Where n is the effective index of fiber 24 and L is the distance between the reference reflector and the sensor. As the laser is tuned, the signal D at detector 44 from any one sensor is given by $$D=\cos(k2nL) \quad \text{(Eq. 7)}$$

where the constant k is the wavenumber of the light, given by $$k=2\pi/\lambda \quad \text{(Eq. 8)}$$

where $\lambda$ is the wavelength of the light. The response of each sensor with respect to the reference reflector is limited to the narrow wavelength range over which the sensor reflects. The total signal at detector 44 at any given point in time, then, is given by the sum of sensor responses:

$$D_{tot}=\Sigma_i R_i \cos(k2nL_i) \quad \text{(Eq. 9)}$$

where R is the spectrum of the ith sensor. As such, each sensor 32, 34, 132, 134 is modulated by a signal with a unique frequency which is governed by the position of the sensor along fiber 24.

Figure 4:
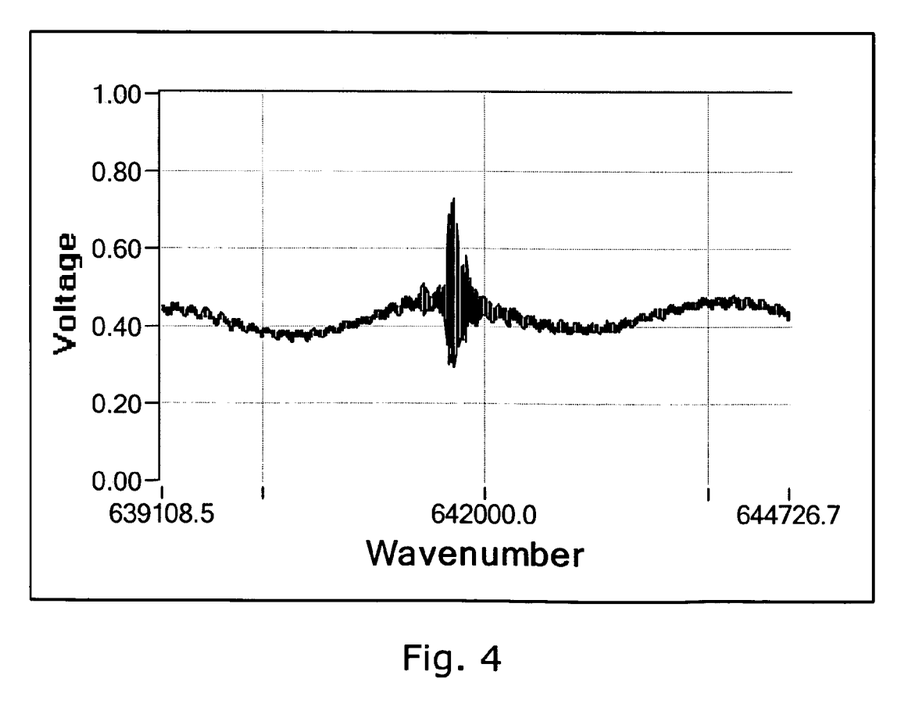
FIG. 4 is a graphical representation of raw data acquired from a sensor system according to the present invention.
Figure 5:
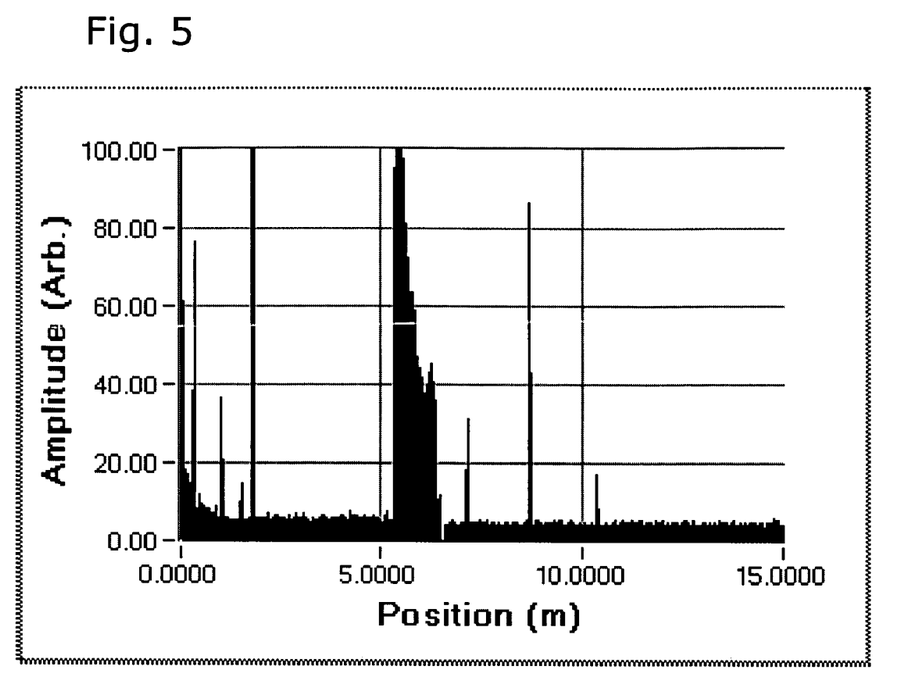
FIG. 5. is a graphical representation of the raw data of FIG. 4 after Fourier transformation.
Figure 6:
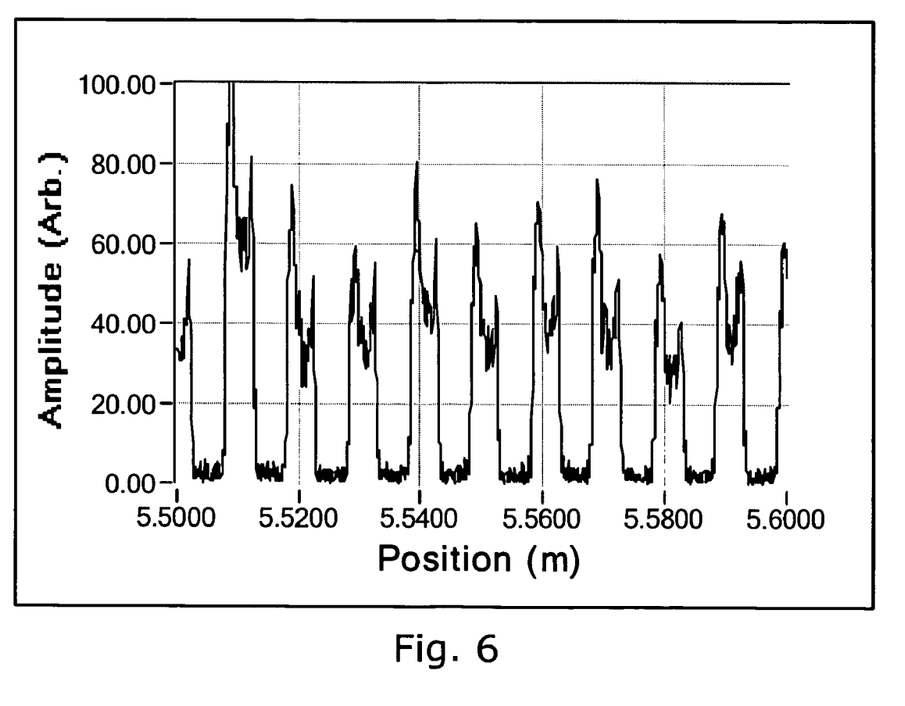
FIG. 6 is a graphical representation of one region of the data as shown in FIG. 5.
Figure 7:
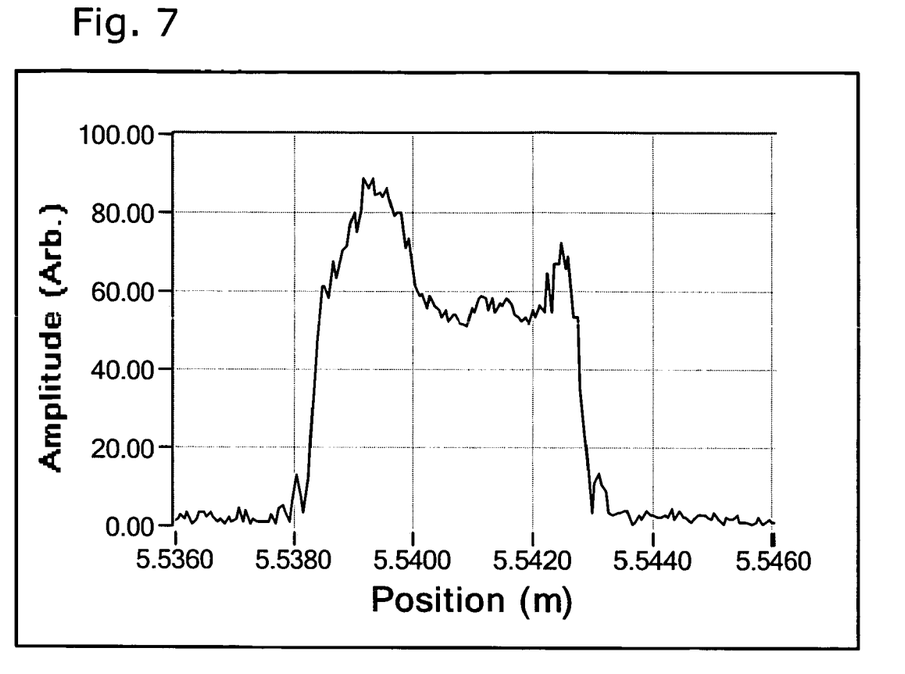
FIG. 7 is a graphical representation of the data from one sensor.
Figure 8:
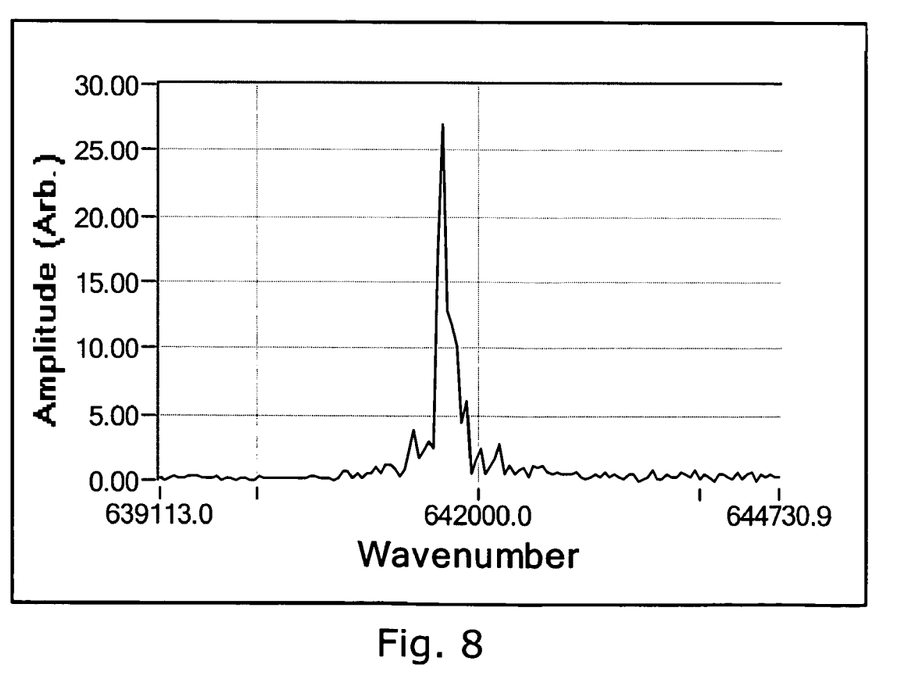
FIG. 8 is a graphical representation of the data of FIG. 7 after inverse Fourier transformation.

Processing unit 46 of SIU 14 takes the raw data from detector 44, an example of which is shown in FIG. 4, and performs a Fast Fourier Transform on the data to obtain the bandpass-filtered signal as shown in FIG. 5. This signal shows the individual peaks from each sensor when the scale of the graph is altered to "zoom in" on a specific segment of the signal, as shown in FIG. 6, or on a single sensor, as shown in FIG. 7. The spectrum of a single sensor is then obtained by performing an inverse Fourier transformation on only that portion of the data that contains the information from a single sensor. The resultant spectrum from the current example is shown in FIG. 8. The reflected wavenumber is then determined using the spectral peak, which may be determined using a number of different methods known in the art, such as by using the apparent central peak. Information regarding the conditions within well 12 is then extrapolated from the reflected wavenumber using known relationships.

A similar process is followed if Rayleigh scattering sensors are used in system 10. In this case, the actual Rayleigh scattering at a location 32 is compared to the expected Rayleigh scattering as stored in the memory of processor 46. The information regarding the conditions within well 12 is then extrapolated from the detected difference between actual and anticipated Rayleigh scattering using known relationships. One example of how to extrapolate the desired information is more fully described in U.S. Pat. No. 6,545,760, which is incorporated herein in its entirety by reference thereto.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with feature(s) and/or element(s) from other embodiment(s). Therefore, it will be understood that the appended claims are intended to cover all such modifications and embodiments which would come within the spirit and scope of the present invention.

The invention claimed is:

1. A system for monitoring a well comprising:
   an OFDR unit;
   an optical fiber extending from the OFDR unit;
   at least two optical sensors disposed along a length of the optical fiber; and
   means for increasing a sensing length of the optical fiber wherein said means comprises a physical interleaving of the at least two optical sensors and a reference reflector located on said optical fiber.

2. A system for monitoring a well comprising:
   an OFDR unit;
   an optical fiber extending from the OFDR unit;
   a first plurality of first sensors, wherein the first sensors are disposed at a first set of locations over a first length of the optical fiber;
   a second plurality of second sensors, wherein the second sensors are disposed at a second set of locations over a second length of the optical fiber, wherein the second set of locations correspond with but are slightly offset from the first set of locations;
   a first reference reflector disposed at a center of the first length of the optical fiber; and
   a second reference reflector disposed at a center of the second length of the optical fiber.

3. The system of claim 2, wherein the sensors comprise fiber Bragg gratings.

4. The system of claim 2, wherein the sensors comprise Rayleigh scattering profiles.

5. The system of claim 2, wherein at least one of the first and second reference reflectors comprises a Fresnel reflector.

6. The system of claim 2, wherein at least one of the first and second reference reflectors comprises a band limited reflector.

7. The system of claim 2, wherein the OFDR unit comprises
   a tunable laser source;
   a trigger interferometer;
   a photodetector; and
   a fiber coupler.

8. The system of claim 2, wherein at least one sensor is placed beyond a Nyquist sampling limit.

9. The system of claim 2, wherein the OFDR unit comprises at least one filter upstream of a photodetector.

10. The system of claim 2, wherein the OFDR unit comprises at least one filter downstream of a photodetector.

11. The system of claim 2, wherein the first and second lengths are approximately 1 km.

12. The system of claim 2, wherein the first sensors respond only to a first narrow range of frequencies, and wherein the first and second ranges of frequencies are transmitted simultaneously.

13. The system of claim 2, wherein the first sensors respond only to a first narrow range of frequencies, and wherein the second sensors respond only to a second narrow range of frequencies, and wherein the first and second ranges of frequencies are transmitted sequentially.

14. The system of claim 2 further comprising a WDM unit.

15. A system for monitoring a well comprising:
an OFDR unit;
an optical fiber extending from the OFDR unit;
a reference reflector;
a first plurality of sensors disposed at a first set of distances as measured from the reference reflector; and
a second plurality of sensors disposed at a second set of distances as measured from the reference reflector, wherein the reference reflector is disposed between the first plurality of sensors and the second plurality of sensors, and wherein the second set of distances is similar to but slightly offset from the first set of distances.

16. The system of claim 15, wherein the sensors comprise fiber Bragg gratings.

17. The system of claim 15, wherein the sensors comprise Rayleigh scattering profiles.

18. The system of claim 15, wherein the reference reflector comprises a Fresnel reflector.

19. The system of claim 15, wherein the reference reflector comprises a narrow band reflector.

20. The system of claim 15, wherein the OFDR unit comprises
a tunable laser source;
a trigger interferometer;
a photodetector; and
a fiber coupler.

21. The system of claim 15 further comprising a WDM unit.

22. A system for monitoring a well comprising:
an OFDR unit;
an optical fiber extending from the OFDR unit;
a reference reflector;
a plurality of sensors disposed along a length of the optical fiber, wherein at least one sensor is placed beyond a distance limit imposed by Nyquist sampling.

* * * * *